(12) United States Patent
Tabatabai et al.

(10) Patent No.: US 7,705,889 B2
(45) Date of Patent: Apr. 27, 2010

(54) SHUTTER TIME COMPENSATION

(75) Inventors: Ali Tabatabai, Cupertino, CA (US); Chuen-Chien Lee, Pleasanton, CA (US); Mohammed Zubair Visharam, Santa Clara, CA (US); Naofumi Yanagihara, Tokyo (JP); Yoichi Yagasaki, Tokyo (JP); Teruhiko Suzuki, Tokyo (JP); Liming Wang, Hang Zhou (CN)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 121 days.

(21) Appl. No.: 11/818,673

(22) Filed: Jun. 15, 2007
(Under 37 CFR 1.47)

(65) Prior Publication Data
US 2008/0309778 A1 Dec. 18, 2008

(51) Int. Cl.
*H04N 5/225* (2006.01)
(52) U.S. Cl. .................................. 348/220.1; 348/222.1
(58) Field of Classification Search ............... 348/220.1, 348/222.1, 231.6, 362
See application file for complete search history.

(56) References Cited

U.S. PATENT DOCUMENTS

| | | | |
|---|---|---|---|
| 5,987,179 A | 11/1999 | Riek et al. | |
| 6,633,676 B1 | 10/2003 | Kleihorst et al. | |
| 6,937,273 B1 * | 8/2005 | Loui | 348/220.1 |
| 6,937,723 B2 | 8/2005 | Boland et al. | 379/406.06 |
| 7,043,059 B2 * | 5/2006 | Cheatle et al. | 348/142 |
| 2005/0084166 A1 * | 4/2005 | Boneh et al. | 382/239 |
| 2006/0120450 A1 | 6/2006 | Han et al. | 375/240.03 |
| 2006/0159430 A1 | 7/2006 | Sugahara et al. | |
| 2006/0268991 A1 * | 11/2006 | Segall et al. | 375/240.24 |

FOREIGN PATENT DOCUMENTS

JP 2002278690 A 6/2000

* cited by examiner

*Primary Examiner*—Gevell Selby
(74) *Attorney, Agent, or Firm*—Haverstock & Owens LLP

(57) ABSTRACT

A hybrid imaging device is configured to capture low resolution video and high resolution still images. The imaging device is configured to apply motion information obtained from the low resolution video to a reference high resolution still image to generate a missing moment of interest high resolution still image. The low-resolution video is captured at a high frame rate in conjunction with a few high-resolution still pictures taken at periodic intervals. A user locates a desired scene of interest, e.g. a moment of interest, from the captured video, and a post-processing technique is used to generate the high resolution still picture corresponding to the selected moment of interest. The high resolution still image is generated using texture information from one or more nearby captured high resolution still images and motion information from the low-resolution video frame corresponding to the selected moment of interest.

18 Claims, 5 Drawing Sheets

SHUTTER TIME COMPENSATION

FIELD OF THE INVENTION

The present invention relates to the field of image/video processing and compression. More particularly, the present invention relates to the field of AVC image/video capture, encoding, and generating high resolution still images from captured image/video data.

BACKGROUND OF THE INVENTION

The term "codec" refers to either "compressor/decompressor", "coder/decoder", or "compression/decompression algorithm", which describes a device or algorithm, or specialized computer program, capable of performing transformations on a data stream or signal. Codecs encode a data stream or signal for transmission, storage or encryption and decode it for viewing or editing. For example, a digital video camera converts analog signals into digital signals, which are then passed through a video compressor for digital transmission or storage. A receiving device then decompresses the received signal via a video decompressor, and the decompressed digital signal is converted to an analog signal for display. A similar process can be performed on audio signals. There are numerous standard codec schemes. Some are used mainly to minimize file transfer time, and are employed on the Internet. Others are intended to maximize the data that can be stored in a given amount of disk space, or on a CD-ROM. Each codec scheme may be handled by different programs, processes, or hardware.

A digital image is a representation of a two-dimensional image as a finite set of digital values, called picture elements or pixels. Typically, pixels are stored in computer memory as a raster image or raster map, which is a two-dimensional array of integers. These values are often transmitted or stored in a compressed form.

Digital images can be created by a variety of input devices and techniques, such as digital cameras and camcorders, scanners, coordinate-measuring machines, seismographic profiling, airborne radar, and more. They can also be synthesized from arbitrary non-image data, such as mathematical functions or three-dimensional geometric models; the latter being a major sub-area of computer graphics. The field of digital image processing is the study or use of algorithms to perform image processing on digital images. Image codecs include such algorithms to perform digital image processing.

Different image codecs are utilized to see the image depending on the image format. The GIF, JPEG and PNG images can be seen simply using a web browser because they are the standard internet image formats. The SVG format is now widely used in the web and is a standard W3C format. Other programs offer a slideshow utility, to see the images in a certain order one after the other automatically.

Still images have different characteristics than video. For example, the aspect ratios and the colors are different. As such, still images are processed differently than video, thereby requiring a still image codec for still images and a video codec, different from the still image codec, for video.

A video codec is a device or software module that enables the use of data compression techniques for digital video data. A video sequence consists of a number of pictures (digital images), usually called frames. Subsequent frames are very similar, thus containing a lot of redundancy from one frame to the next. Before being efficiently transmitted over a channel or stored in memory, video data is compressed to conserve both bandwidth and memory. The goal of video compression is to remove the redundancy between frames to gain better compression ratios. There is a complex balance between the video quality, the quantity of the data needed to represent it (also known as the bit rate), the complexity of the encoding and decoding algorithms, their robustness to data losses and errors, ease of editing, random access, end-to-end delay, and a number of other factors.

A typical digital video codec design starts with the conversion of input video from a RGB color format to a YCbCr color format, and often followed by chroma sub-sampling to produce a sampling grid pattern. Conversion to the YCbCr color format improves compressibility by de-correlating the color signals, and separating the perceptually more important luma signal from the perceptually less important chroma signal, and which can be represented at lower resolution.

Some amount of spatial and temporal down-sampling may also be used to reduce the raw data rate before the basic encoding process. Down-sampling is the process of reducing the sampling rate of a signal. This is usually done to reduce the data rate or the size of the data. The down-sampling factor is typically an integer or a rational fraction greater than unity. This data is then transformed using a frequency transform to further de-correlate the spatial data. One such transform is a discrete cosine transform (DCT). The output of the transform is then quantized and entropy encoding is applied to the quantized values. Some encoders can compress the video in a multiple step process called n-pass encoding, for example 2-pass, which is generally a slower process, but potentially provides better quality compression.

The decoding process consists of essentially performing an inversion of each stage of the encoding process. The one stage that cannot be exactly inverted is the quantization stage. There, a best-effort approximation of inversion is performed. This part of the process is often called "inverse quantization" or "dequantization", although quantization is an inherently non-invertible process.

A variety of codecs can be easily implemented on PCs and in consumer electronics equipment. Multiple codecs are often available in the same product, avoiding the need to choose a single dominant codec for compatibility reasons.

Some widely-used video codecs include, but are not limited to, H.261, MPEG-1 Part 2, MPEG-2 Part 2, H.263, MPEG-4 Part 2, MPEG-4 Part 10/AVC, DivX, XviD, 3ivx, Sorenson 3, and Windows Media Video (MWV).

MPEG codecs are used for the generic coding of moving pictures and associated audio. MPEG video codecs create a compressed video bit-stream traditionally made up of a series of three types of encoded data frames. The three types of data frames are referred to as an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame display order. Such frames are usually predicted from two directions, for example from the I- or P-frames that immediately precede or the P-frame that immediately follows the predicted frame. These bidirectionally predicted frames are called B-frames.

B-frames and P-frames require fewer bits to store picture data, as they generally contain difference bits for the difference between the current frame and a previous frame, subsequent frame, or both. B-frames and P-frames are thus used to reduce the redundant information contained across frames. A decoder in operation receives an encoded B-frame or encoded P-frame and uses a previous or subsequent frame to reconstruct the original frame. This process is much easier than reconstructing each original frame independently and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frame or B-frame is associated with an area in the previous or next image that it is well-correlated with, as selected by the encoder using a "motion vector" that is obtained by a process termed "Motion Estimation." The motion vector that maps the current macroblock to its correlated area in the reference frame is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

Many conventional imaging devices are configured to capture high resolution still images in addition to video. Such devices are also known as hybrid camera/camcorders. In such devices, a still image is captured when the photographer presses a capture button on the device. Each captured still image corresponds to a specific video frame captured at the same instant in time as the still image, if the video was also captured in parallel.

When using imaging devices, such as cameras and camcorders, a frequent problem that a user encounters is known as "Shutter Lag". This term is generally defined as a delay that occurs between the photographer pressing the capture button and the shutter actually opening to capture the desired event of interest. Shutter lag can also be caused due to mechanical delay in the imaging device itself. This is a very common problem experienced by users especially in the photography of fast moving objects. To overcome this problem, users are required to press the capture button before the event actually takes place, with some forethought. This delay, is highly variable and depends on many factors such as device type, amount of motion in scene, camera settings, etc. Due to this delay, the user on most accounts tends to miss the actual scene of interest, referred to herein as a "Moment of Interest" (MOI).

In hybrid devices including both a still image and a video capture function, a conventional approach to the shutter lag problem is to up-sample the base-layer video frame corresponding to the missed moment of interest A positive aspect of this technique is its simplicity. An inherent drawback lies in the up-sampling artifacts that are very clearly visible in the up-sampled high-resolution picture. As such, this approach may be suitable for preview, etc, but is not a good technique to create high quality pictures for printing or other applications.

SUMMARY OF THE INVENTION

An imaging device is described in which high resolution still images are generated for missed "moments of interest" (MOI). In some embodiments, the application of interest is for a hybrid camera/camcorder, where users while taking lower resolution video may become interested to capture a higher resolution still image. However, due to many reasons such as shutter delay, capture delay due to camera internal signal processing, human delay in using the device, etc., the user may not be able to capture the desired MOI. Instead, a moment before or after the MOI is usually captured. As opposed to the conventional approach of integer/fractional up-sampling of the MOI in the lower resolution video, which produces a blurred high resolution still image, the imaging device utilizes information from the high frequency texture area, which is available from already captured high resolution still images, together with motion information available from a lower resolution video sequence to perform intelligent up-sampling of the lower resolution video frame/field to correspond to the missed MOI in order to generate a much better quality high resolution still picture corresponding to the missed MOI.

In one aspect, a camera and camcorder combination is configured to compensate for shutter time delay. The camera and camcorder combination includes a camera module configured to capture higher resolution still images, a camcorder module configured to capture lower resolution video, and a processing module configured to generate a missed moment of interest higher resolution still image according to a reference higher resolution still image captured by the camera module at a different time than the captured higher resolution still images and motion information determined from corresponding video frames captured by the camcorder module. The camera/camcorder can also include a memory to store the higher resolution still images including the reference higher resolution still image captured by the camera module and to store the lower resolution video captured by the camcorder module. The camera/camcorder can also include a capture button, wherein the camera module is configured to capture a first higher resolution still image upon a first activation of the capture button, and the camcorder module is configured to start capturing a first lower resolution video stream upon the first activation of the capture button. The camera module can also be configured to capture a second higher resolution still image upon a second activation of the capture button, and the camcorder module is further configured to stop capturing the first lower resolution video stream upon the second activation of the capture button.

In another aspect, an imaging device to compensate for shutter time delay is disclosed. The imaging device includes a still image capture module configured to capture higher resolution still images, a video capture module configured to capture lower resolution video, and a processing module configured to generate a missed moment of interest higher resolution still image according to a reference higher resolution still image captured by the still image capture module at a different time than the captured higher resolution still images and motion information determined from corresponding video frames captured by the video capture module. The imaging device can also include a memory to store the higher resolution still images including the reference higher resolution still image captured by the still image capture module and to store the lower resolution video captured by the video capture module. The imaging device can also include a capture button, wherein the still image capture module is configured to capture a first higher resolution still image upon a first activation of the capture button, and the video capture module is configured to start capturing a first lower resolution video stream upon the first activation of the capture button. The still image capture module can also be configured to capture a second higher resolution still image upon a second activation of the capture button, and the video capture module is further configured to stop capturing the first lower resolution video stream upon the second activation of the capture button.

In yet another aspect, a method of generating a missed moment of interest still image is disclosed. The method includes capturing a lower resolution video stream comprising a series of video frames, periodically capturing one or more higher resolution still images, wherein each captured higher resolution still image corresponds to a specific video frame at a particular time instant, selecting a missed moment of interest using the lower resolution video stream for which a higher resolution still image is to be generated, wherein the selected missed moment of interest corresponds to a first video frame, selecting one of the captured higher resolution still images at a different time instant than the first video frame as a reference higher resolution still image, and selecting a second video frame corresponding to the reference higher resolution still image, determining motion information between the first video frame and the second video frame, up-sampling the motion information, and applying the up-sampled motion information to texture information of the reference higher resolution still image, thereby generating a higher resolution still image corresponding to the missed moment of interest. Each video frame can be a lower resolution video frame. The method can also include partitioning the first video frame into macro-blocks. The method can also include correlating each macro-block in the first video frame to a corresponding area in the second video frame. The method can also include determining a motion vector between each macro-block correlation, thereby determining the motion information. The method can also include partitioning the texture information of the reference higher resolution still image such that a first partition of texture information corresponds to a first macro-block of the second video frame. Applying the up-sampled motion information to the texture information can include applying each motion vector to a corresponding partition of the texture information in the reference higher resolution still image, thereby generating compensated texture information. The method can also include determining if each macro-block correlation meets or exceeds an acceptable threshold. For each correlation that does not meet or exceed the acceptable threshold, the method can also include up-sampling the macro-block of the first video frame corresponding to the correlation that does not exceed the acceptable threshold, and adding the up-sampled macro-block to the higher resolution still image corresponding to the missed moment of interest. In this case, the up-sampled macro-block replaces a corresponding portion of the compensated texture information.

BRIEF DESCRIPTION OF THE DRAWINGS

Embodiments of the imaging device are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Embodiments of a hybrid imaging device are directed to a device configured to capture low resolution video and high resolution still images. In some embodiments, the hybrid imaging device is a handheld, portable video camcorder and camera combination. The imaging device is configured to apply up-sampled motion information obtained from the low resolution video to a reference high resolution still image to generate a missing MOI high resolution still image. In some embodiments, the low-resolution video is captured at a high frame rate in conjunction with a few high-resolution still pictures taken at periodic intervals. A user locates a desired scene of interest, e.g. a Moment of Interest (MOI), from the captured video, and a post-processing technique is used to generate the high resolution still picture corresponding to the selected MOI. The high resolution still image corresponding to the MOI is generated using texture information obtained by applying the up-sampled motion information from the low resolution video frame corresponding to the selected MOI to one or more nearby captured high resolution still images along with the up-sampled residual information obtained from the low resolution video. This technique of reproducing missed events is also termed as generating 'Missed Moment of Interest' (MOI) for the user.

Figure 1:
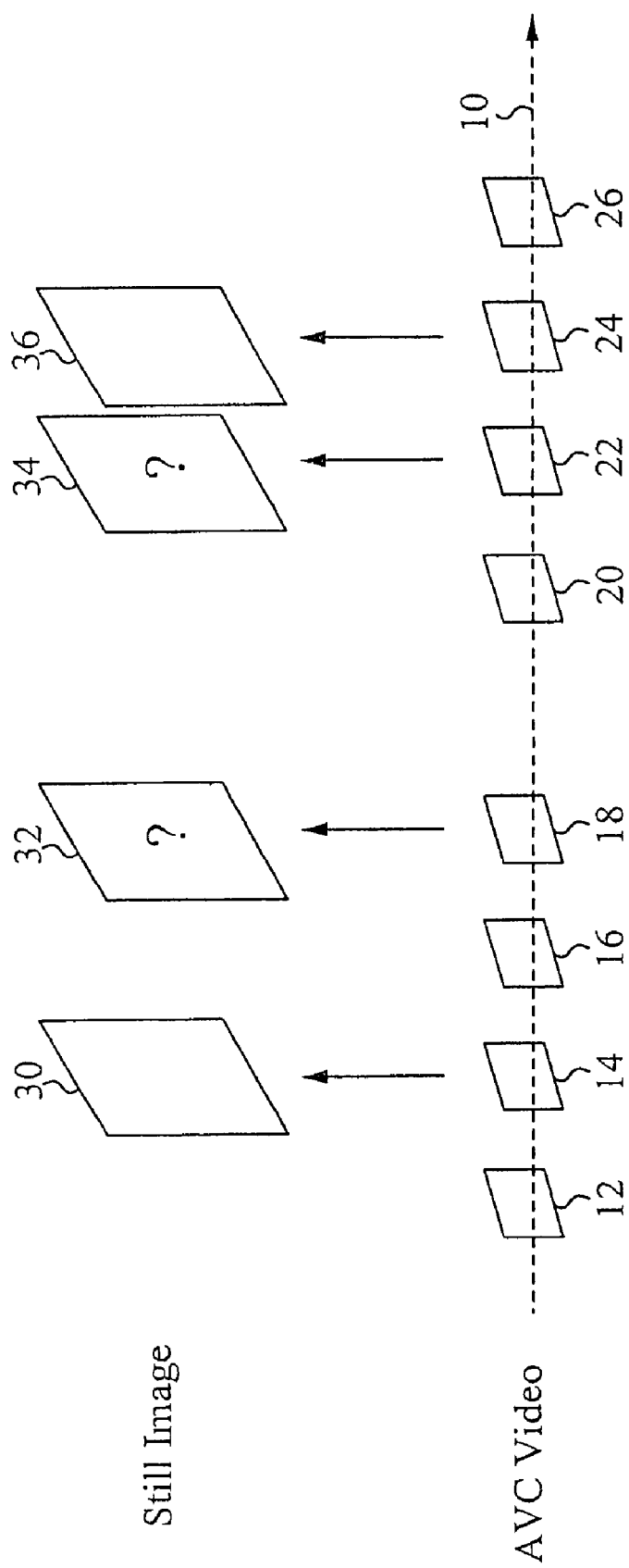
FIG. 1 illustrates an example of captured still images and missing moment of interest still images corresponding to a captured video stream.

FIG. 1 illustrates an example of captured still images and missing moment of interest still images corresponding to a captured video stream. A video stream 10 includes a succession of low resolution video frames 12-26. As each video frame 12-26 is captured by the imaging device, one or more high resolution still images 30 and 36 are also captured by the imaging device. Although two high resolution still images are shown in FIG. 1, it is understood that more or less than two high resolution still images can be captured. The video can be encoded using any video-coding standard (e.g., AVC) and the high-resolution still images can be stored in any image format, for example JPEG (or using another efficient technique to be described later). Two exemplary methods of concurrently encoding a video stream and one or more corresponding high resolution still images are described in the co-owned, co-pending U.S. patent application Serial No. (Sony 30400), filed (Same date as this application), and entitled "AVC Extension to Support Integrated Digital Still Image and Video in a Parallel Mode," and the co-owned, co-pending U.S. patent application Serial No. (Sony 30500), filed (Same date as this application), and entitled "AVC Extension to Support Integrated Digital Still Image and Video in a Sequential Mode," both of which are hereby incorporated in their entirety by reference.

In some embodiments, a high resolution still image is captured when a capture button, e.g. a shutter button, on the imaging device is pressed. Each captured still image corresponds to a low resolution video frame in the captured video stream 10. An exemplary case is shown in FIG. 1 in which the high resolution still image 30 corresponds to the low resolution video frame 14, and the high resolution still image 36 corresponds to the low resolution video frame 24. There is a relationship between each captured still image and the corresponding frame of the video because the still image is the higher resolution content of the same content captured by a frame of the lower resolution video (e.g. both the still image and the corresponding video frame are captured at the same moment in time).

As previously described, missed moments of interest are caused by either mechanical or human delay in capturing a high resolution still image. Alternatively, at a later time frame, the user may desire to generate a high resolution still image that does not correspond to an already captured high resolution still image. As a result, the actual captured high resolution still image(s) may not correspond to an intended or desired moment of interest. Missed moments of interest 32 and 34 illustrate two such instances in which a missed moment of interest still image is desired. The missed moment of interest 32 corresponds to video frame 18, and the missed moment of interest 34 corresponds to the video frame 22. A missed MOI still image is generated by working either forward or backward from a captured high resolution still image. For example, a high resolution still image corresponding to the missed MOI 32 is generated, in part, from the captured high resolution still image 30. In other words, the missed MOI still image 32 follows from the captured high resolution still image 30. Alternatively, a high resolution still image corresponding to the missed MOI 34 is generated, in part, from the captured high resolution still image 36. In other words, the missed MOI still image 34 precedes the captured high resolution still image 36.

Figure 2:
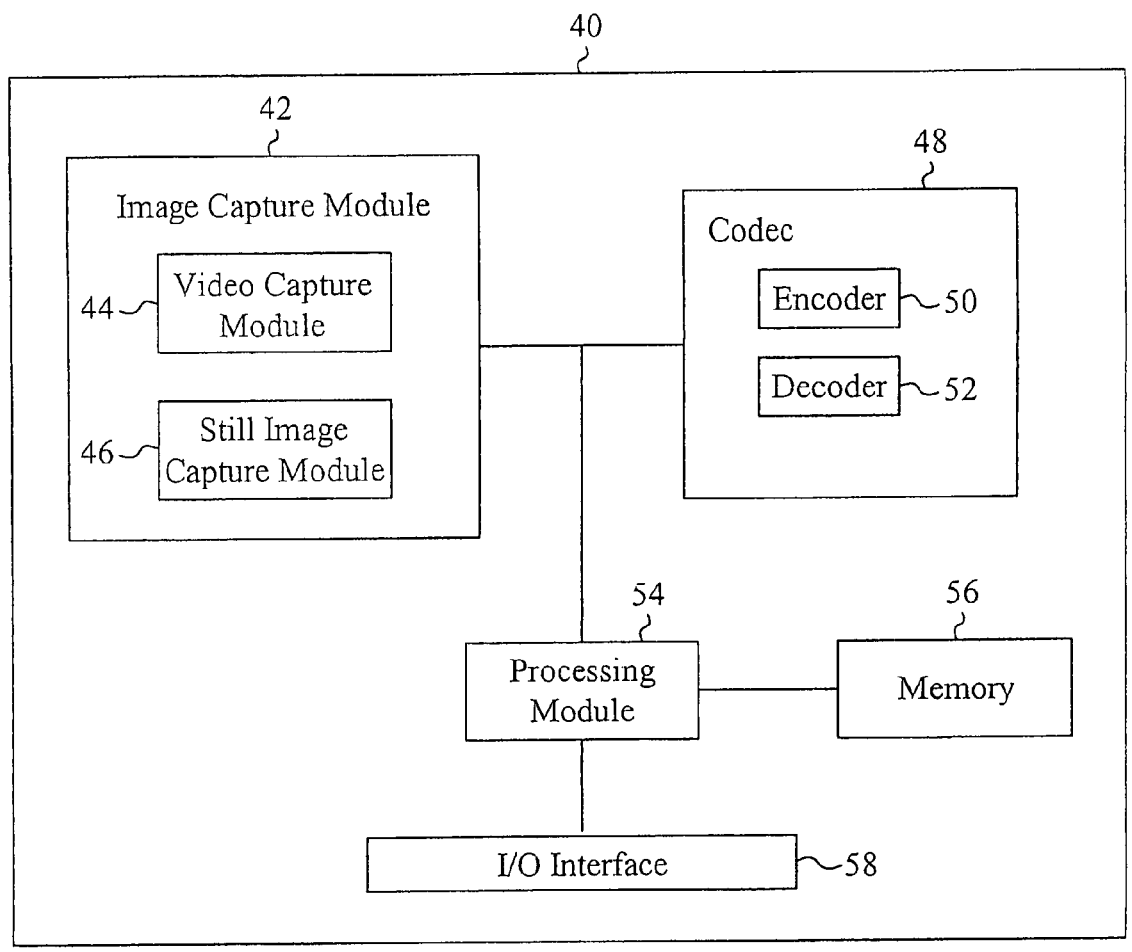
FIG. 2 illustrates a block diagram of an exemplary imaging device configured to generate missed moment of interest still images.

FIG. 2 illustrates a block diagram of an exemplary imaging device configured to generate missed moment of interest still images. The imaging device 40 includes an image capture module 42, a codec 48, a processing module 54, a memory 56, and an input/output (I/O) interface 58. The I/O interface 58 includes a user interface and a network interface for transmitting and receiving data. The memory 56 is any conventional type of data storage medium, either integrated or removable. The codec 48 includes an encoder 50 and a decoder 52. The image capture module 42 includes a video capture module 44 for capturing low resolution video and a still image capture module 46 for capturing high resolution still images. In some embodiments, the imaging device 40 is implemented as a combination camera/camcorder, in which case the still image capture module 46 is implemented as a camera module and the video capture module is implemented as a camcorder module 44. In one configuration, high definition video is captured at 60 fps (frames per second), along with periodic still pictures taken at higher resolutions such as 8 or 10 MP (Mega Pixels). In another configuration, when the user presses a capture button, one high resolution still picture is captured and capture of low resolution video starts until the user presses the capture button again, at which time another high resolution still image is captured and capture of the low resolution video is terminated. It is understood that the imaging device can be alternatively configured to capture video and still images.

Figure 3:
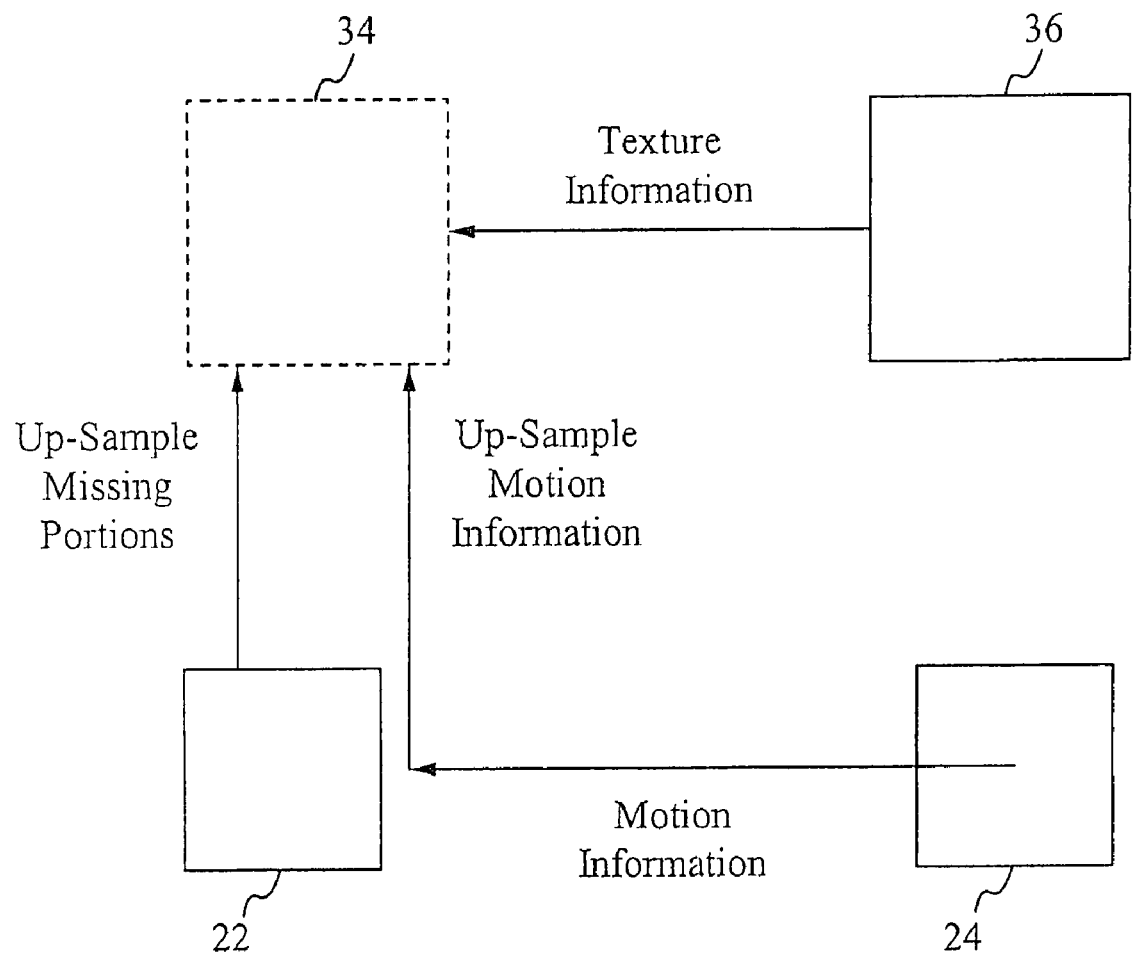
FIG. 3 illustrates the components used to generate a missed moment of interest high resolution still image.

FIG. 3 illustrates the components used to generate a missed moment of interest high resolution still image. In particular, the components shown in FIG. 3 are used to generate the missed MOI still image 34 of FIG. 1. As previously described, there is a relationship between a captured high resolution still image and a corresponding frame of the low resolution video because both the still image and the corresponding video frame are captured at the same moment in time. As applied to FIG. 3, the high resolution still image 36 corresponds to the video frame 24, and the missed MOI still image 34 corresponds to the video frame 22. The up-sampled motion compensation information (motion vector) from the low resolution video is applied to the texture information of the high resolution still image 36 to generate the missing MOI high resolution still image 34. As stated, before the motion information is applied to the texture information of the reference high resolution still image 36, the motion information is up-sampled. This is a necessary step since the determined motion information is taken from low resolution video. As such, the low resolution motion information must be scaled up to be used with the higher resolution texture information from the reference still image. The captured high resolution still image 36 is used as a reference point for the texture information. There is a limit as to how far backward or forward a given high resolution still image can be used as a reference due to the on-going motion of the event being captured. As such, the "quality" of the reference high resolution still image and the motion information from the corresponding low resolution video determines the usefulness of this reference information. Based on the accuracy and correctness of the motion information (from the low resolution video) and the texture information (from the captured high resolution still image 36), the missing MOI high resolution still image 34 is generated. For those portions of the missing MOI still image 34 that do not correlate to quality motion information from the video or quality texture information from the reference high resolution still image 36, corresponding portions in the video frame 22 are up-sampled and added to the missing MOI still image 34. It is understood that the terms "quality", "accuracy", and "correctness" are relative terms and are determined on an application dependent basis.

Although the components shown in FIG. 3 are used to work backwards to generate the missing MOI still image 34 from the captured high resolution still image 36, the components in general can be used to work forward or backward from a captured high resolution still image, e.g. starting with a captured high resolution still image, a missing MOI that either precedes or follows the captured high resolution still image can be generated.

Figure 4:
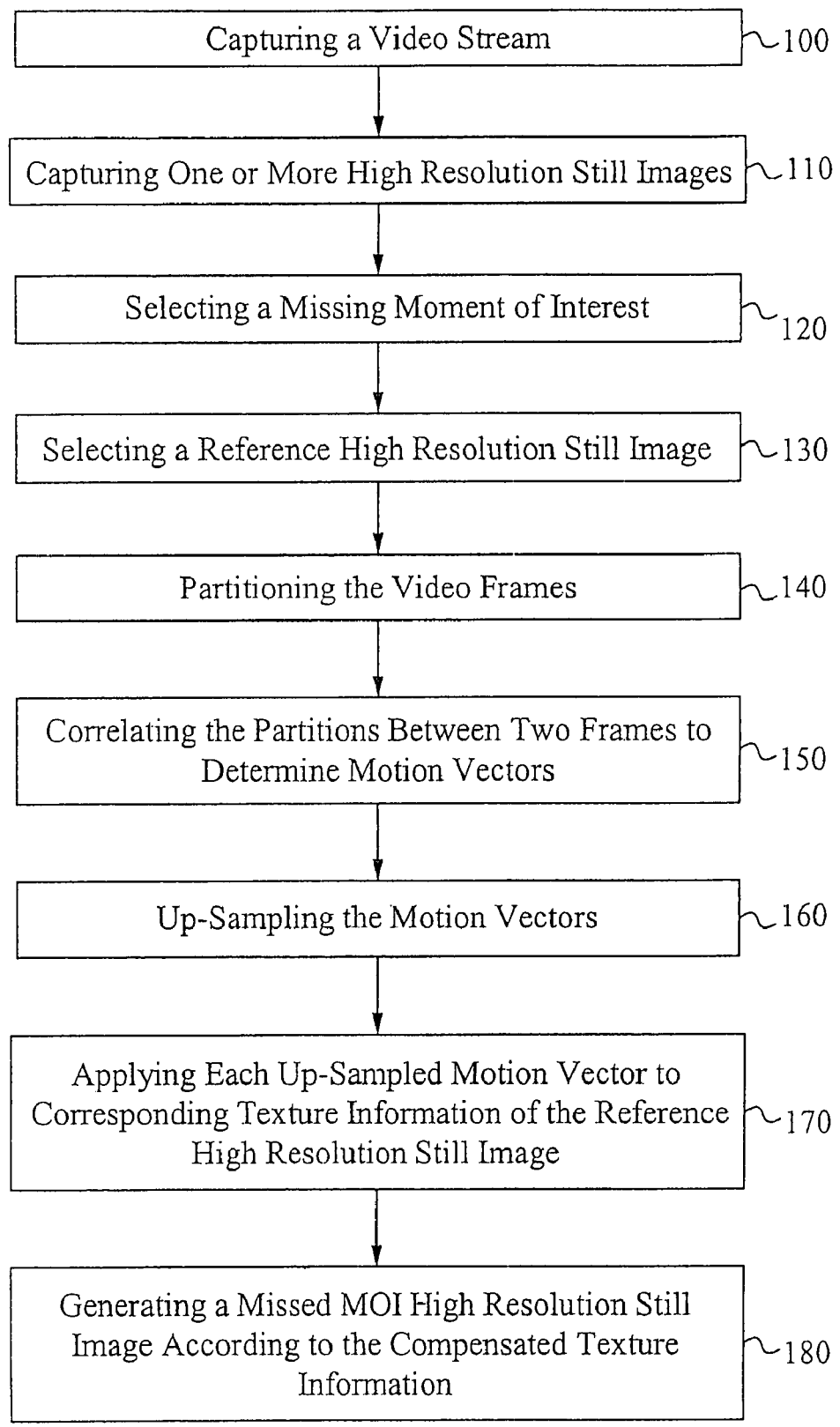
FIG. 4 illustrates an exemplary process for using the components in FIG. 3 to generate a missing MOI still image.

FIG. 4 illustrates an exemplary process for using the components in FIG. 3 to generate a missing MOI still image. At the step 100, a video stream including a series of video frames is captured, such as the video stream 10 including video frames 12-26. In some embodiments, the video stream is a low resolution video stream. At the step 110, one or more high resolution still images are captured, such as the high resolution still images 30 and 36. Each captured still image corresponds to one of the video frames in the captured video stream. For example, captured high resolution still image 36 corresponds to video frame 24. The step 100 and the step 110 can be performed sequentially or in parallel. At the step 120, a missing moment of interest, such as missing moment of interest 34, is selected for which a high resolution still image is to be generated. The missing moment of interest corresponds to one of the video frames different than the video frames corresponding to the already captured high resolution still images. For example, missing moment of interest 34 corresponds to video frame 22. At the step 130, one of the already captured high resolution still images is selected as a reference high resolution still image. The reference high resolution still image either chronologically precedes or follows the missing moment of interest. In some embodiments, the one already captured high resolution still image that is closest to the missed moment of interest chronologically is selected as the reference high resolution still image.

At the step 140, the video frame corresponding to the missing moment of interest is partitioned. In some embodiments, the video frame is partitioned into macro-blocks. At the step 150, for each macro-block in the video frame corresponding to the missing MOI still image, a correlation is made to an area in the video frame corresponding to the reference high resolution still image that provides a closest match. The vector that provides such correspondence is referred to as a motion vector. Cumulatively, the motion vectors are the motion information. At the step 160, each motion vector is up-sampled. The up-sampling factor is determined by the ratio of the dimensions of the high-resolution still image to the dimensions of the low-resolution video frame. In some cases, this factor could be an integer and in others it could be a fractional value. The up-sampling factors for both the horizontal and vertical motion vectors could be similar or different depending on the ratios.

At the step 170, the texture information from the reference high resolution still image, such as high resolution still image 36, is also partitioned, where the size of the partition is suitably magnified to match the up-sampling ratios obtained at the step 160, and referenced to the macro-blocks in the corresponding video frame, such as the video frame 24. At the step 180, each up-sampled motion vector is applied to the texture information in the corresponding portion of the reference high resolution still image, according to the referenced macro-blocks, to generate the texture information for the missing MOI still image. In general, the texture information of the reference high resolution still image is used as a reference point, and the motion information from the corresponding video is up-sampled and applied to the reference texture information to generate compensated texture information, which is then used to generate the missing MOI high resolution still image.

Figure 5:
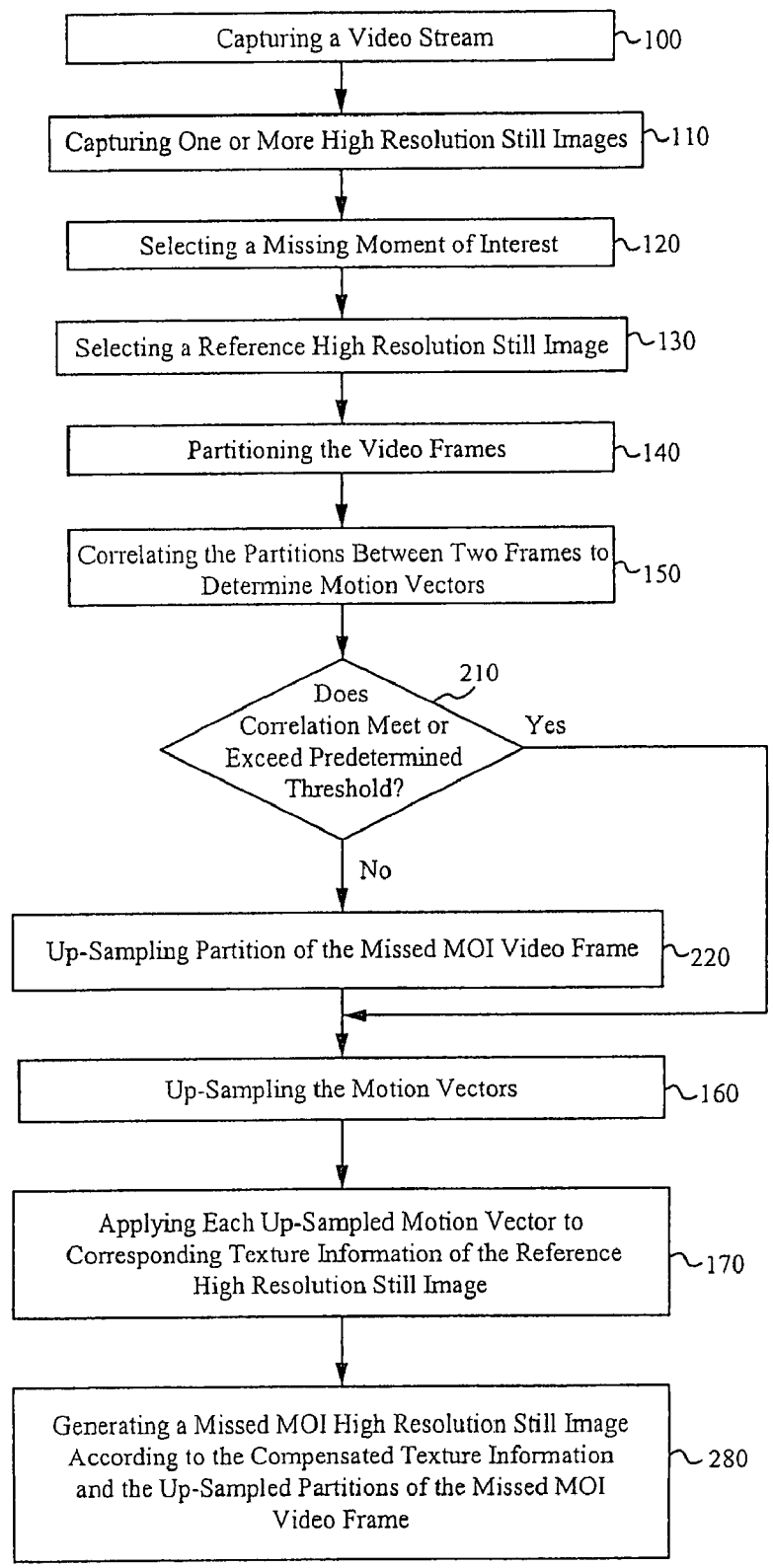
FIG. 5 illustrates an adaptation to the process of FIG. 4 to compensate for inadequate motion information.

In some cases, movement within the event being captured prevents adequate motion information from being obtained for particular macro-blocks. In such cases, the corresponding macro-block within the missed MOI video frame, such as the video frame 22, is up-sampled and added to the generated missing MOI still image, such as missing MOI high resolution still image 34. It is understood that the term "adequate" is a relative term and is determined on an application dependent basis. FIG. 5 illustrates an adaptation to the process of FIG. 4 to compensate for inadequate motion information. The process of FIG. 4 is adapted by adding the step 210 and the step 220 between the step 150 and the step 160, and the step 180 is replaced by the step 280. Specifically, after the correlations are made between each macro-block in the video frame corresponding to the missing MOI still image and a macro-block in the video frame corresponding to the reference high resolution still image, it is determined at the step 210 if each correlation meets or exceeds a predetermined threshold for usability. For each correlation that does not meet or exceed the predetermined threshold, then at the step 220 the macro-block in the video frame corresponding to the missing MOI still image is up-sampled directly. At the step 280, the compensated texture information generated at the step 170 and all up-sampled macro-blocks from the step 220 are used to generate a missing MOI high resolution still image, such as the missing MOI high resolution still image 34.

It is understood that the process described above in relation to FIGS. 1-5 are for exemplary purposes only and that alternative methods and device configurations can be used to achieve the same objectives. For example, the base layer video can be an interlaced video. In this case, an efficient de-interlacing algorithm is used to convert the base layer field into frames. In another example, the periodic high-resolution still pictures that are captured can be stored using the concept of Intra-Spatial Scalability instead of JPEG, to conserve storage space in the imaging device.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A camera/camcorder to compensate for shutter time delay, the camera/camcorder comprising:
   a. a camera module configured to capture higher resolution still images;
   b. a camcorder module configured to capture lower resolution video; and
   c. a processing module configured to generate a missed moment of interest higher resolution still image according to a reference higher resolution still image captured by the camera module at a different time than the captured higher resolution still images and motion information determined from corresponding video frames captured by the camcorder module.

2. The camera/camcorder of claim 1 further comprising a memory to store the higher resolution still images including the reference higher resolution still image captured by the camera module and to store the lower resolution video captured by the camcorder module.

3. The camera/camcorder of claim 1 further comprising a capture button, wherein the camera module is configured to capture a first higher resolution still image upon a first activation of the capture button, and the camcorder module is configured to start capturing a first lower resolution video stream upon the first activation of the capture button.

4. The camera/camcorder of claim 3 wherein the camera module is further configured to capture a second higher resolution still image upon a second activation of the capture button, and the camcorder module is further configured to stop capturing the first lower resolution video stream upon the second activation of the capture button.

5. An imaging device to compensate for shutter time delay, the imaging device comprising:
   a. a still image capture module configured to capture higher resolution still images;
   b. a video capture module configured to capture lower resolution video; and
   c. a processing module configured to generate a missed moment of interest higher resolution still image according to a reference higher resolution still image captured by the still image capture module at a different time than the captured higher resolution still images and motion information determined from corresponding video frames captured by the video capture module.

6. The imaging device of claim 5 further comprising a memory to store the higher resolution still images including the reference higher resolution still image captured by the still image capture module and to store the lower resolution video captured by the video capture module.

7. The imaging device of claim 5 further comprising a capture button, wherein the still image capture module is configured to capture a first higher resolution still image upon a first activation of the capture button, and the video capture module is configured to start capturing a first lower resolution video stream upon the first activation of the capture button.

8. The imaging device of claim 7 wherein the still image capture module is further configured to capture a second higher resolution still image upon a second activation of the capture button, and the video capture module is further configured to stop capturing the first lower resolution video stream upon the second activation of the capture button.

9. A method of generating a missed moment of interest still image, the method comprising:
   a. capturing a lower resolution video stream comprising a series of video frames;
   b. periodically capturing one or more higher resolution still images, wherein each captured higher resolution still image corresponds to a specific video frame at a particular time instant;
   c. selecting a missed moment of interest using the lower resolution video stream for which a higher resolution still image is to be generated, wherein the selected missed moment of interest corresponds to a first video frame;
   d. selecting one of the captured higher resolution still images at a different time instant than the first video frame as a reference higher resolution still image, and selecting a second video frame corresponding to the reference higher resolution still image;
   e. determining motion information between the first video frame and the second video frame;
   f. up-sampling the motion information; and
   g. applying the up-sampled motion information to texture information of the reference higher resolution still image, thereby generating a higher resolution still image corresponding to the missed moment of interest.

10. The method of claim 9 wherein each video frame comprises a lower resolution video frame.

11. The method of claim 9 further comprising partitioning the first video frame into macro-blocks.

12. The method of claim 11 further comprising correlating each macro-block in the first video frame to a corresponding area in the second video frame.

13. The method of claim 12 further comprising determining a motion vector between each macro-block correlation, thereby determining the motion information.

14. The method of claim 13 further comprising partitioning the texture information of the reference higher resolution still image such that a first partition of texture information corresponds to a first macro-block of the second video frame.

15. The method of claim 14 wherein applying the up-sampled motion information to the texture information comprises applying each motion vector to a corresponding partition of the texture information in the reference higher resolution still image, thereby generating compensated texture information.

16. The method of claim 15 further comprising determining if each macro-block correlation meets or exceeds an acceptable threshold.

17. The method of claim 16 wherein for each correlation that does not meet or exceed the acceptable threshold, the method further comprises up-sampling the macro-block of the first video frame corresponding to the correlation that does not exceed the acceptable threshold, and adding the up-sampled macro-block to the higher resolution still image corresponding to the missed moment of interest.

18. The method of claim 17 wherein the up-sampled macro-block replaces a corresponding portion of the compensated texture information.

* * * * *

UNITED STATES PATENT AND TRADEMARK OFFICE
CERTIFICATE OF CORRECTION

PATENT NO. : 7,705,889 B2  Page 1 of 1
APPLICATION NO. : 11/818673
DATED : April 27, 2010
INVENTOR(S) : Ali Tabatabai et al.

It is certified that error appears in the above-identified patent and that said Letters Patent is hereby corrected as shown below:

At col. 6, lines 62-63, please delete "U.S. patent application Serial No. (Sony 30400), filed" and insert: -- U.S. patent application Serial No. 11/999,297, filed 12/04/2007, --

At col. 6, lines 66-67, please delete "U.S. patent application Serial No. (Sony 30500), filed" and insert: -- U.S. patent application Serial No. 11/999,377, filed 12/04/2007, --

Signed and Sealed this

Sixth Day of July, 2010

David J. Kappos
*Director of the United States Patent and Trademark Office*